United States Patent
Trush et al.

(10) Patent No.: US 7,544,150 B2
(45) Date of Patent: Jun. 9, 2009

(54) ENGINE TORQUE ERROR LEARN DURING DYNAMIC VEHICLE TEST

(75) Inventors: Christopher J. Trush, Novi, MI (US); David W. Wright, Howell, MI (US); Craig M. Fazakerly, Howell, MI (US); John E. Marano, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 376 days.

(21) Appl. No.: 11/417,311

(22) Filed: May 2, 2006

(65) Prior Publication Data

US 2006/0264298 A1 Nov. 23, 2006

Related U.S. Application Data

(60) Provisional application No. 60/683,578, filed on May 23, 2005.

(51) Int. Cl.
*F16H 59/48* (2006.01)
*B60W 10/04* (2006.01)
*G06F 7/00* (2006.01)

(52) U.S. Cl. ............................ 477/120; 477/115; 701/59

(58) Field of Classification Search ................. 477/115, 477/120, 107, 111, 113, 143, 154, 906, 904; 701/101, 110, 59; 73/113.05, 114.13, 114.15, 73/118.02
See application file for complete search history.

(56) References Cited

U.S. PATENT DOCUMENTS

| | | | | |
|---|---|---|---|---|
| 5,826,208 A * | 10/1998 | Kuroiwa et al. | ................ | 701/54 |
| 6,067,494 A * | 5/2000 | Noda et al. | .................... | 701/54 |
| 6,090,011 A * | 7/2000 | Minowa et al. | ............. | 477/107 |
| 6,308,125 B1 | 10/2001 | Gleason et al. | | |
| 6,401,026 B2 * | 6/2002 | Robichaux et al. | .......... | 701/110 |
| 6,704,638 B2 | 3/2004 | Livshiz et al. | | |
| 2004/0204813 A1 * | 10/2004 | Doering | ....................... | 701/110 |
| 2004/0267436 A1 * | 12/2004 | Prodi et al. | .................. | 701/110 |

FOREIGN PATENT DOCUMENTS

JP 02005076593 A * 3/2005

* cited by examiner

*Primary Examiner*—Roger Pang

(57) ABSTRACT

A method of regulating gear shifts of a transmission driven by an engine includes calculating a first torque error and calculating a second torque error. A compensation torque is determined based on the first torque error and the second torque error. The gear shifts are regulated based on the compensation torque.

24 Claims, 3 Drawing Sheets

ENGINE TORQUE ERROR LEARN DURING DYNAMIC VEHICLE TEST

CROSS-REFERENCE TO RELATED APPLICATIONS

This application claims the benefit of U.S. Provisional Application No. 60/683,578, filed on May 23, 2005. The disclosure of the above application is incorporated herein by reference.

FIELD OF THE INVENTION

The present invention relates to engine systems, and more particularly to engine torque error learning (TEL) during a dynamic vehicle test (DVT).

BACKGROUND OF THE INVENTION

Internal combustion engines combust a fuel and air mixture within cylinders driving pistons to produce drive torque. The engine drives a transmission through a coupling device. In the case of an automatic transmission, the coupling device includes a torque converter. The transmission transfers the drive torque to a driveline through one of a plurality of gear ratios. The transmission shifts between gear ratios based on a shift schedule and vehicle operating conditions.

The transmission typically includes a plurality of clutches that are selectively engaged to establish a desired gear ratio. When shifting between gear ratios, clutch-to-clutch shifts occur. More specifically, at least one clutch is disengaged (i.e., off-going clutch) while another clutch is concurrently engaged (i.e., on-coming clutch). Control of the clutch-to-clutch shift is based on an estimated engine torque ($T_{EST}$). $T_{EST}$ is determined using a torque estimating calculation that is based on engine operating conditions. However, $T_{EST}$ is not always sufficiently accurate to provide the desired clutch-to-clutch shift quality. More specifically, the transmission is sensitive to error in $T_{EST}$, which reduces the shift quality of the transmission.

SUMMARY OF THE INVENTION

Accordingly, the present invention provides a method of regulating gear shifts of a transmission driven by an engine. The method includes calculating a first torque error and calculating a second torque error. A compensation torque is determined based on the first torque error and the second torque error. The gear shifts are regulated based on the compensation torque.

In one feature, the compensation torque is determined from a look-up table based on the first torque error and the second torque error.

In another feature, the method further includes determining an estimated engine torque and correcting the estimated engine torque based on the compensation torque to provide a corrected estimated engine torque. The gear shifts are regulated based on the corrected estimated engine torque.

In still other features, the method further includes determining a first estimated engine torque at a first engine speed and determining a first measured engine torque at the first engine speed. The first torque error is calculated based on the first estimated engine torque and the first measured engine torque. A second estimated engine torque is determined at a second engine speed and a second measured engine torque is determined at the second engine speed. The second torque error is calculated based on the second estimated engine torque and the second measured engine torque.

In yet another feature, the method further includes engaging a plurality of clutches of the transmission to provide a tie-up condition of the transmission. The first torque error and the second torque error are calculated based on operating conditions during the tie-up condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
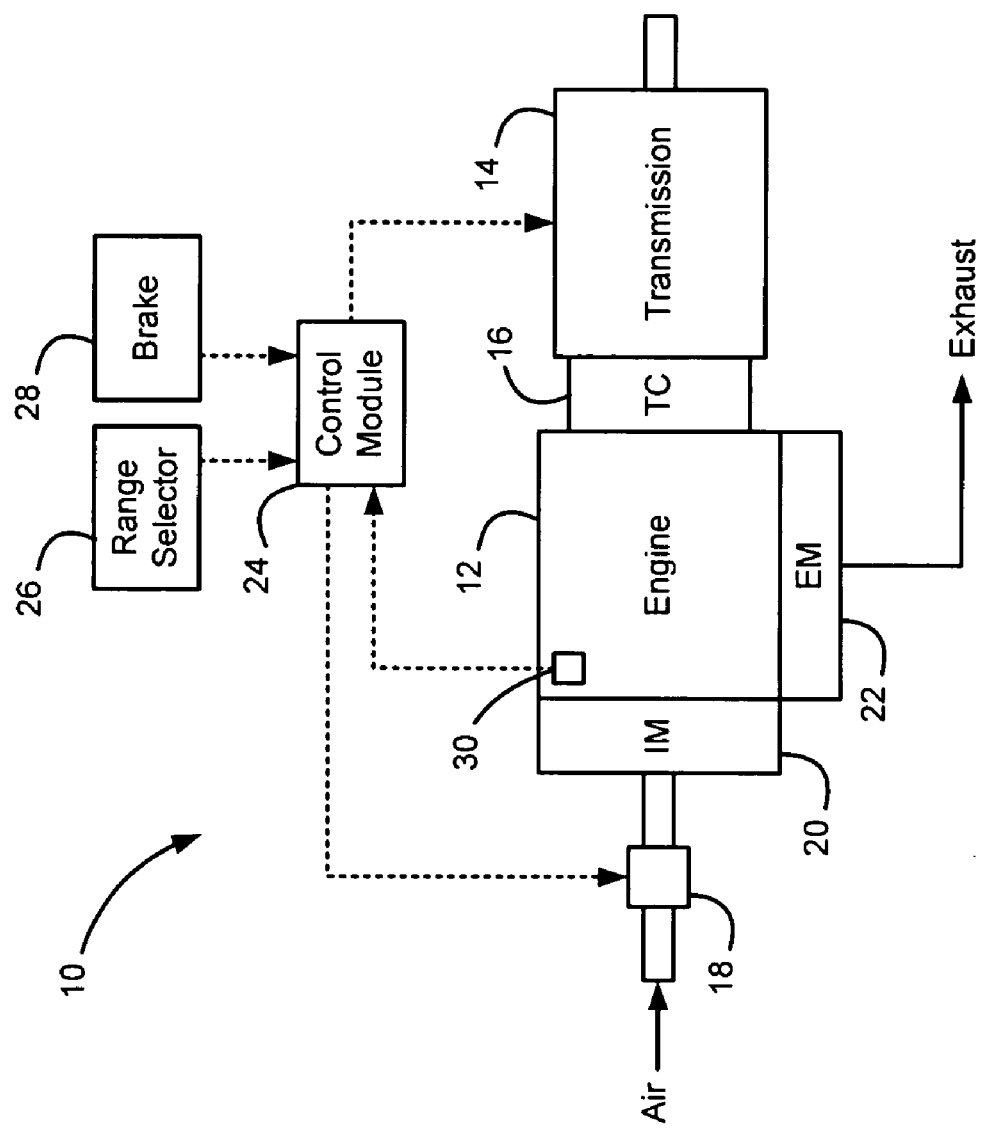
FIG. 1 is a functional block diagram of an exemplary vehicle system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is schematically illustrated. The vehicle system 10 includes an engine 12 that combusts a fuel and air mixture within cylinders (not shown) to drive pistons slidably disposed within the cylinders. The pistons drive a crankshaft (not shown) that drives a transmission 14 through a torque converter 15. Air is drawn through a throttle 18 and into an intake manifold 20 that distributes air to the individual cylinders. Exhaust generated by the combustion process is exhausted to an after-treatment system (not shown) through an exhaust manifold 22.

The torque converter 16 is a fluid coupling that enables the engine to spin somewhat independently of the transmission 14. Although not illustrated, the torque converter 16 includes a pump, a turbine and a stator. The pump is a centrifugal pump that is driven by the engine 12. Fluid pumped by the pump, drives the turbine, which in turn drives the transmission 14. The stator redirects fluid returning from the turbine before it hits the pump again to increase the efficiency of the torque converter 16. In a torque converter stall condition, the pump is turning but the turbine is not.

A control module 24 regulates operation of the vehicle system 10. More specifically, the control module 24 operates the engine 12 and transmission 14 based on signals from operator input devices including, but not limited to, a range selector 26 and a brake pedal 28. The range selector 26 enables the operator to put the transmission 14 into one of a plurality of ranges including, but not limited to, a drive range (D), a reverse range (R), a neutral range (N) and a park range (P). The control module 24 also regulates engine operation based on signals from various sensors including, but not limited to, an engine RPM sensor 30.

Figure 2:
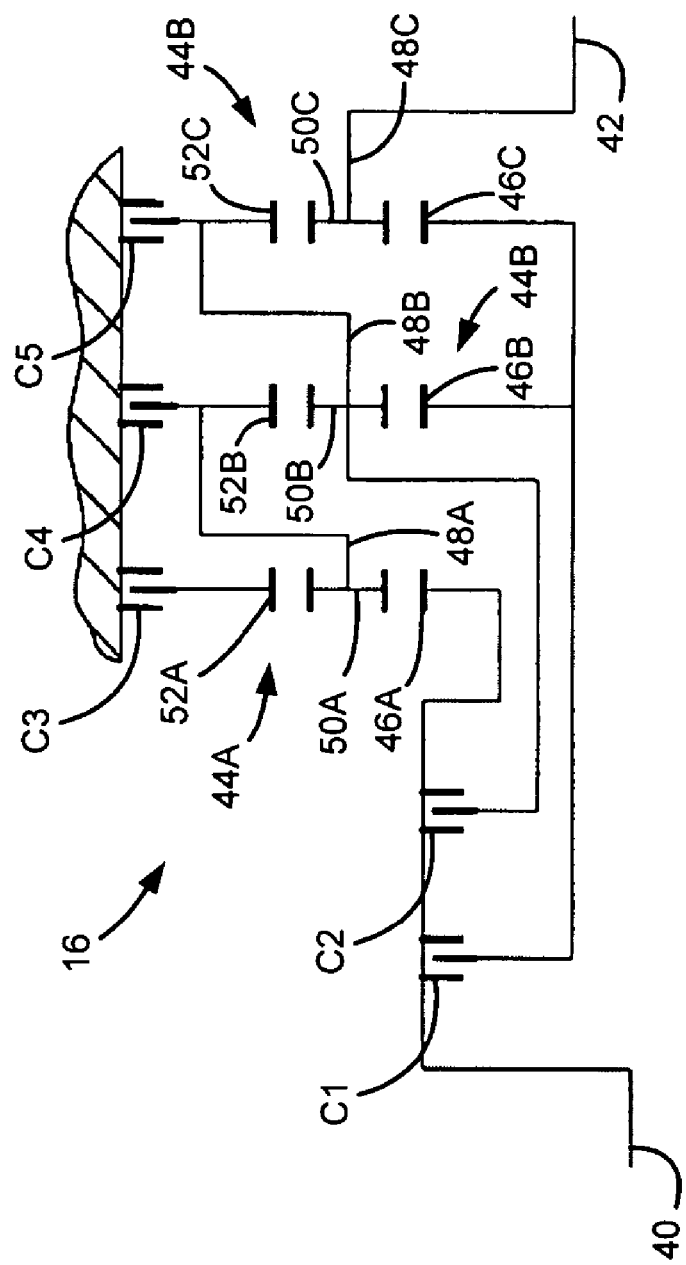
FIG. 2 is a functional block diagram of a transmission of the vehicle system of FIG. 1.

Referring now to FIG. 2, an exemplary transmission 16 is illustrated. The exemplary transmission 14 is a six-speed automatic transmission that is disclosed in commonly assigned U.S. Pat. No. 6,308,125, issued on Oct. 23, 2001 and entitled Adaptive Clutch Control of a Closed-Throttle Downshift, the disclosure of which is expressly incorporated herein by reference. It is appreciated that the specific transmission described herein is merely exemplary in nature and that the torque error compensation control of the present invention can be implemented with various other transmissions.

The transmission 14 includes an input shaft 40, an output shaft 42 and three inter-connected planetary gear sets 44A, 44B and 44C, respectively. The planetary gear sets 44A,44B, 44C include respective sun gears 46A,46B,46C, carriers 48A, 48B,48C, planetary gears 50A,50B,50C and ring gears 52A, 52B,52C. The transmission 14 further includes clutches C1-C5 that are selectively engaged to establish a desired gear ratio of the transmission 14. More specifically, the input shaft 40 continuously drives the sun gear 46A of the gear set 44A, selectively drives the sun gears 46B,46C of the gear sets 44B,44C via the clutch C1 and selectively drives the carrier 48B of the gear set 44B via the clutch C2. The ring gears 52A,52B,52C of the gear sets 44A,44B,44C are selectively grounded via the clutches C3, C4 and C5, respectively.

As diagrammed in Table 1 below, the state of the clutches C1-C5 (i.e., engaged or disengaged) can be controlled to provide six forward speed ratios (1, 2, 3, 4, 5, 6), a reverse speed ratio (R) or a neutral condition (N).

TABLE 1

|       | C1 | C2 | C3 | C4 | C5 |
|-------|----|----|----|----|----|
| $1^{st}$ | X  |    |    |    | X  |
| $2^{nd}$ | X  |    |    | X  |    |
| $3^{rd}$ | X  |    | X  |    |    |
| $4^{th}$ | X  | X  |    |    |    |
| $5^{th}$ |    | X  | X  |    |    |
| $6^{th}$ |    | X  |    | X  |    |
| R     |    |    | X  |    | X  |
| N     |    |    |    |    | X  |

For example, the second forward speed ratio is established when clutches C1 and C4 are engaged. Shifting from one speed forward speed ratio to another is generally achieved by disengaging one clutch (i.e., the off-going clutch) while engaging another clutch (i.e., the on-coming clutch). For example the transmission is downshifted from second to first by disengaging clutch C4 while engaging clutch C5.

The control module 24 regulates operation of the vehicle system 10 based on a compensated torque ($T_{COMP}$) that is determined using the TEL routine of the present invention. More specifically, prior to entering the marketplace, the vehicle system 10 undergoes a dynamic vehicle test (DVT). The DVT is a functional verification of the vehicle performance and is conducted on a roll-test machine. The DVT operations may include, but are not limited to, emission control, engine operation, transmission, brakes, ABS/traction control, cruise control and final drive ratio. During the DVT, the operator stays in the vehicle and performs the each operation according to a pre-determined test schedule.

The present invention incorporates the TEL routine into the DVT. More specifically, $T_{COMP}$ is determined from a multi-dimensional look-up table based on a high torque error ($T_{ERRHI}$) and a low torque error ($T_{ERRLO}$) that are calculated based on operating conditions monitored during the TEL. $T_{ERRHI}$ and $T_{ERRLO}$ are based on an estimated engine torque ($T_{EST}$) and a measured engine torque ($T_{MEAS}$).

$T_{EST}$ is calculated by the control module 24 using a torque estimation calculation that is based on engine operating conditions. An exemplary engine torque estimator is disclosed in commonly assigned U.S. Pat. No. 6,704,638, issued on Mar. 9, 2004 and entitled Torque Estimator for Engine RPM and Torque Control, the disclosure of which is expressly incorporated herein by reference. $T_{MEAS}$ is the amount of torque measured at the torque converter pump and is determined according to the following relationship:

$$T_{MEAS} = RPM^2 \times k^2$$

where k is a unit-less quantity that is determined based on a torque converter speed ratio (i.e., turbine RPM to engine RPM). More specifically, k is a relative measure of the tightness of the torque converter. The lower the value of k, the tighter the torque converter (i.e., engine RPM is lower at torque converter stall). $T_{MEAS}$ is also disclosed and discussed in further detail in U.S. Pat. No. 6,704,638.

The TEL control initiates a tie-up condition of the transmission. More specifically, a plurality of the clutches C1-C5 are engaged to inhibit torque transfer through the transmission 14 (i.e., inhibiting rotation of the input shaft 40) while the transmission 14 is in the D range. In this manner, the torque converter pump rotates while the turbine is inhibited from rotating. While in the tie-up condition and with the brake applied, the engine RPM is commanded to a first or low level ($RPM_{LO}$). When at or sufficiently near $RPM_{LO}$, a plurality of samples of an estimated low engine torque ($T_{ESTLO}$) and a measured low engine torque ($T_{MEASLO}$) are calculated. A low torque error ($T_{ERRLO}$) is determined as the difference between an average value of $T_{ESTLO}$ (i.e., average of the plurality of samples taken) and an average value of $T_{MEASLO}$ (i.e., average of the plurality of samples taken).

The engine RPM is next commanded to a second or high level ($RPM_{HI}$). When at or sufficiently near $RPM_{HI}$, a plurality of samples of an estimated high engine torque ($T_{ESTHI}$) and a measured high engine torque ($T_{MEASHI}$) are determined. A high torque error ($T_{ERRHI}$) is determined as the difference between an average value of $T_{ESTHI}$ (i.e., average of the plurality of samples taken) and an average value of $T_{MEASHI}$ (i.e., average of the plurality of samples taken).

$T_{COMP}$ is determined based on $T_{ERRHI}$ and $T_{ERRLO}$. More specifically, a multi-dimensional look-up table is provided and is pre-programmed in the memory of the control module 24. The look-up table includes an x-axis corresponding to $T_{ERRHI}$ and a y-axis corresponding to $T_{ERRLO}$ and is calibrated based on the engine, torque converter and transmission specifications. An exemplary look-up table is provided in Table 2 below:

TABLE 2

| | $T_{ERRHI}$ | | | | | | | | |
|---|---|---|---|---|---|---|---|---|---|
| $T_{ERRLO}$ | -60 | -50 | -40 | -30 | 0 | 30 | 40 | 50 | 60 |
| -60 | 20 | 15 | 10 | 0 | 0 | 0 | 0 | 0 | 0 |
| -50 | 15 | 15 | 10 | 0 | 0 | 0 | 0 | 0 | 0 |
| -40 | 10 | 10 | 10 | 0 | 0 | 0 | 0 | 0 | 0 |
| -30 | 0 | 0 | 0 | 0 | 0 | 0 | 0 | 0 | 0 |
| 0 | 0 | 0 | 0 | 0 | 0 | 0 | 0 | 0 | 0 |
| 30 | 0 | 0 | 0 | 0 | 0 | 0 | 0 | 0 | 0 |
| 40 | 0 | 0 | 0 | 0 | 0 | 0 | -10 | -10 | -10 |

TABLE 2-continued

| | $T_{ERRHI}$ | | | | | | | | |
|---|---|---|---|---|---|---|---|---|---|
| $T_{ERRLO}$ | −60 | −50 | −40 | −30 | 0 | 30 | 40 | 50 | 60 |
| 50 | 0 | 0 | 0 | 0 | 0 | 0 | −10 | −15 | −15 |
| 60 | 0 | 0 | 0 | 0 | 0 | 0 | −10 | −15 | −25 |

For example, if $T_{ERRHI}$ was equal to −50 Nm and $T_{ERRLO}$ was equal to −40 Nm, $T_{COMP}$ would be set equal to 10 Nm. $T_{COMP}$ is stored in memory and $T_{EST}$ is adjusted based on $T_{COMP}$ during shifting of the transmission. More specifically, $T_{EST}$ is corrected based on $T_{COMP}$ (i.e., $T_{COMP}$ increases or decreases $T_{EST}$) to provide a corrected estimate engine torque ($T_{CORREST}$). It is appreciated that $T_{COMP}$ only partially corrects the error in $T_{EST}$, pushing $T_{EST}$ towards a more correct value. Shifting of the transmission 16 is regulated based on $T_{CORREST}$.

It is anticipated that $T_{COMP}$ is implemented during early-shifts of the transmission. That is to say, $T_{COMP}$ is preferably used for shifts occurring within the first few days of the life of the transmission. It is further anticipated that a shift adapt routine concurrently runs and gradually adjusts $T_{EST}$ to correct for any error. The shift adapt value is then used over the remaining life of the transmission. In this manner, $T_{COMP}$ is integrated into the shift adapt value over time.

Figure 3:
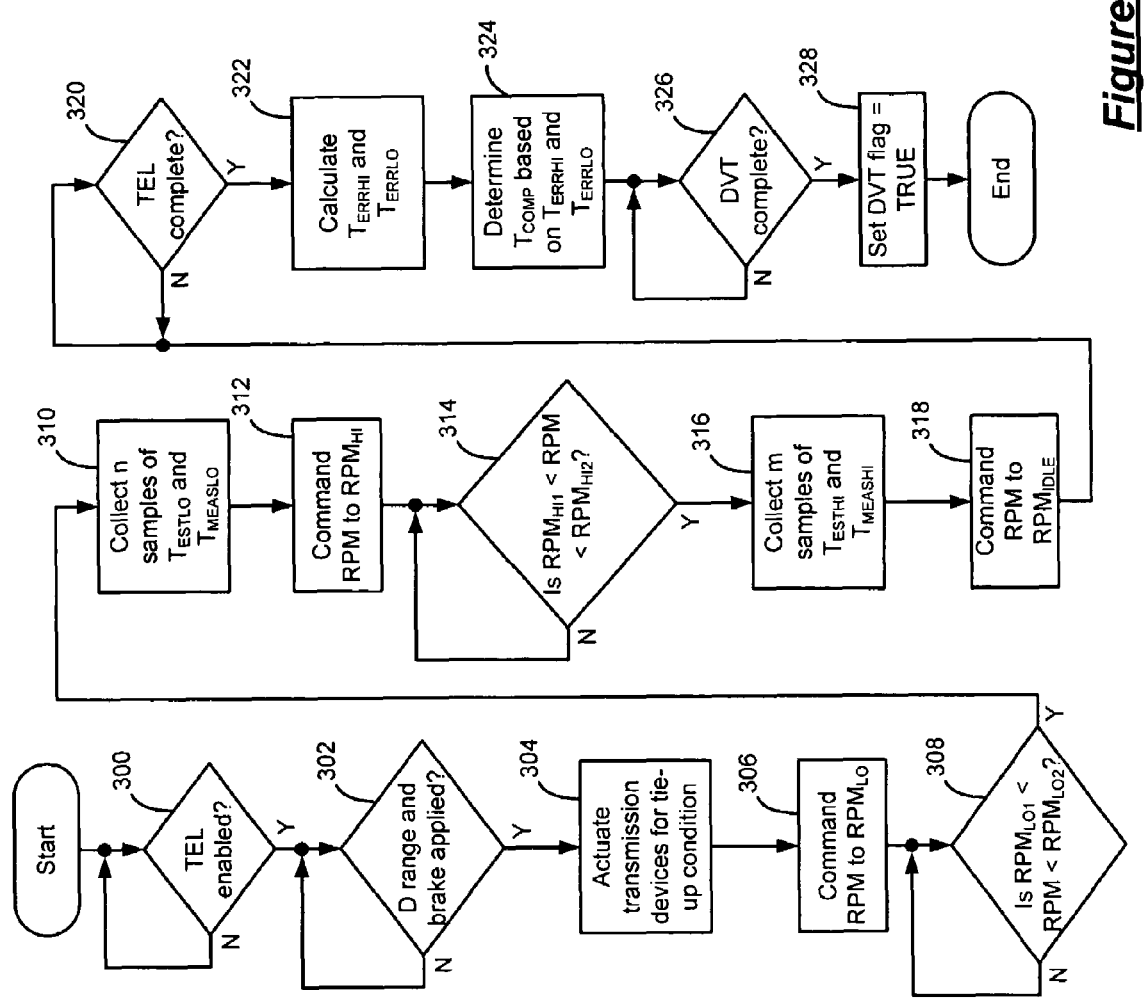
FIG. 3 is a flowchart illustrating exemplary steps executed by the torque error learning (TEL) routine of the present invention.

Referring now to FIG. 3, exemplary steps executed by the TEL control of the present invention will be described in detail. In step 300, control determines whether TEL is enabled. If TEL is not enabled, control loops back. If TEL is enabled, control determines whether the transmission is in the D range and whether the brake is applied in step 302. If the transmission is not in the D range or the brake is not applied, control loops back. If the transmission is in the D range and the brake is applied, control actuates a plurality of the clutches C1-C5 to provide a tie-up condition of the transmission in step 304. More specifically, three or more of the clutches C1-C5 are engaged to inhibit torque transfer through the transmission (i.e., inhibiting rotation of the input shaft).

In step 306, control commands the engine RPM to a low RPM range ($RPM_{LO}$) (e.g., 1000 RPM). In step 308, control determines whether the engine RPM is sufficiently near $RPM_{LO}$, by determining whether the engine RPM is between a lower low threshold $RPM_{LO1}$ and an upper low threshold $RPM_{LO2}$. If RPM is not greater than $RPM_{LO1}$ and is not less than $RPM_{LO2}$, control loops back. If RPM is greater than $RPM_{LO1}$ and is less than $RPM_{LO2}$, control continues in step 310. In step 310, control collects n samples of $T_{ESTLO}$ and $T_{MEASLO}$.

In step 312, control commands the engine RPM to a high RPM range ($RPM_{HI}$) (e.g., 2500 RPM). In step 314, control determines whether the engine RPM is sufficiently near $RPM_{HI}$, by determining whether the engine RPM is between a lower high threshold $RPM_{HI1}$ and an upper high threshold $RPM_{HI2}$. If RPM is not greater than $RPM_{HI1}$ and is not less than $RPM_{HI2}$, control loops back. If RPM is greater than $RPM_{HI1}$ and is less than $RPM_{HI2}$, control continues in step 316. In step 316, control collects m samples of $T_{ESTHI}$ and $T_{MEASHI}$. In step 318, control commands the engine RPM to an idle RPM ($RPM_{IDLE}$).

In step 320, control determined whether TEL is complete. If TEL is not complete, control loops back. If TEL is complete, control calculates $T_{ERRHI}$ and $T_{ERRLO}$ based on the n samples of $T_{ESTLO}$ and $T_{MEASLO}$ and the m samples of $T_{ESTHI}$ and $T_{MEASHI}$. In step 324, control determines $T_{COMP}$ based on $T_{ERRHI}$ and $T_{ERRLO}$. Control determines whether the DVT is complete in step 326. If the DVT is not complete, control loops back. If the DVT is complete, control sets a DVT flag equal to TRUE in step 328 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of regulating gear shifts of a transmission driven by an engine, comprising:
   determining a first estimated engine torque at a first engine speed;
   determining a first measured engine torque at said first engine speed;
   calculating a first torque error;
   calculating a second torque error;
   determining a compensation torque based on said first torque error and said second torque error; and
   regulating said gear shifts based on said compensation torque, wherein said first torque error is calculated based on said first estimated engine torque and said first measured engine torque.

2. The method of claim 1 wherein said compensation torque is determined from a look-up table based on said first torque error and said second torque error.

3. The method of claim 1 further comprising:
   determining an estimated engine torque; and
   correcting said estimated engine torque based on said compensation torque to provide a corrected estimated engine torque, wherein said gear shifts are regulated based on said corrected estimated engine torque.

4. The method of claim 1 further comprising:
   determining a second estimated engine torque at a second engine speed; and
   determining a second measured engine torque at said second engine speed, wherein said second torque error is calculated based on said second estimated engine torque and said second measured engine torque.

5. A method of regulating gear shifts of a transmission driven by an engine, comprising:
   engaging a plurality of clutches of said transmission to provide a tie-up condition of said transmission;
   calculating a first torque error;
   calculating a second torque error;
   determining a compensation torque based on said first torque error and said second torque error; and
   regulating said gear shifts based on said compensation torque, wherein said first torque error and said second torque error are calculated based on operating conditions during said tie-up condition.

6. A method of correcting an estimated torque used to regulate gear shifts in a transmission that is driven by an engine of a vehicle, comprising:
   generating a tie-up condition of said transmission;
   calculating a first torque error based on operating conditions during said tie-up condition;
   calculating a second torque error based on operating conditions during said tie-up condition;
   determining a compensation torque based on said first torque error and said second torque error; and
   correcting said estimated engine torque based on said compensation torque to provide a corrected estimated engine torque.

7. The method of claim 6 further comprising regulating said gear shifts based on said corrected estimated engine torque.

8. The method of claim 6 wherein said compensation torque is determined from a look-up table based on said first torque error and said second torque error.

9. The method of claim 6 further comprising:
determining a first estimated engine torque at a first engine speed; and
determining a first measured engine torque at said first engine speed, wherein said first torque error is calculated based on said first estimated engine torque and said first measured engine torque.

10. The method of claim 9 further comprising:
determining a second estimated engine torque at a second engine speed; and
determining a second measured engine torque at said second engine speed, wherein said second torque error is calculated based on said second estimated engine torque and said second measured engine torque.

11. The method of claim 6 further comprising engaging a plurality of clutches of said transmission to provide said tie-up condition of said transmission.

12. A method of correcting an estimated torque used to regulate gear shifts in a transmission that is driven by an engine of a vehicle, comprising:
initiating a torque error learning (TEL) routine during a dynamic vehicle test (DVT) of said;
calculating a first torque error based on operating conditions during said TEL routine;
calculating a second torque error based on operating conditions during said TEL routine;
determining a compensation torque based on said first torque error and said second torque error; and
correcting said estimated engine torque based on said compensation torque to provide a corrected estimated engine torque.

13. The method of claim 12 further comprising generating a tie-up condition of said transmission, wherein said first and second torque errors are calculated based on operating conditions during said tie-up condition.

14. The method of claim 12 further comprising:
setting a memory flag indicating that said DVT is complete; and
regulating said gear shifts based on said corrected estimated engine torque.

15. The method of claim 12 wherein said compensation torque is determined from a look-up table based on said first torque error and said second torque error.

16. The method of claim 12 further comprising:
determining a first estimated engine torque at a first engine speed; and
determining a first measured engine torque at said first engine speed, wherein said first torque error is calculated based on said first estimated engine torque and said first measured engine torque.

17. The method of claim 16 further comprising:
determining a second estimated engine torque at a second engine speed; and
determining a second measured engine torque at said second engine speed, wherein said second torque error is calculated based on said second estimated engine torque and said second measured engine torque.

18. The method of claim 13 further comprising engaging a plurality of clutches of said transmission to provide said tie-up condition of said transmission.

19. The method of claim 12, wherein said dynamic vehicle test is conducted prior to entering said vehicle into service in a marketplace.

20. A transmission control system for regulating gear shifts in an automatic transmission that is driven by an engine, comprising:
a clutch that is actuated to shift gears in said transmission; and
a control module that calculates a first torque error and a second torque error during a torque error learning routine, that determines a compensation torque based on said first torque error and said second torque error and that regulates gears shifts by actuating said clutch based on said compensation torque, wherein said control module determines a first estimated engine torque at a first engine speed and determines a first measured engine torque at said first engine speed, and wherein said first torque error is calculated based on said first estimated engine torque and said first measured engine torque.

21. The transmission control system of claim 20 wherein said compensation torque is determined from a look-up table based on said first torque error and said second torque error.

22. The transmission control system of claim 20 wherein said control module determines an estimated engine torque and corrects said estimated engine torque based on said compensation torque to provide a corrected estimated engine torque, wherein said gear shifts are regulated based on said corrected estimated engine torque.

23. The transmission control system of claim 20 wherein said control module determines a second estimated engine torque at a second engine speed and determines a second measured engine torque at said second engine speed, wherein said second torque error is calculated based on said second estimated engine torque and said second measured engine torque.

24. A transmission control system for regulating gear shifts in an automatic transmission that is driven by an engine, comprising:
a clutch that is actuated to shift gears in said transmission; and
a control module that calculates a first torque error and a second torque error during a torque error learning routine, that determines a compensation torque based on said first torque error and said second torque error and that regulates gears shifts by actuating said clutch based on said compensation torque, wherein said control module actuates a plurality of clutches of said transmission to provide a tie-up condition of said transmission, and wherein said first torque error and said second torque error are calculated based on operating conditions during said tie-up condition.

* * * * *